April 30, 1957        J. J. McNEILL        2,790,915

FLIP-FLOP ELEMENTS FOR CONTROL SYSTEMS

Filed Nov. 16, 1955

WITNESSES

INVENTOR
Jon J. McNeill
ATTORNEY

United States Patent Office 2,790,915
Patented Apr. 30, 1957

2,790,915

FLIP-FLOP ELEMENTS FOR CONTROL SYSTEMS

Jon J. McNeill, Wilkinsburg, Pa., assignor to Westinghouse Electric Corporation, East Pittsburgh, Pa., a corporation of Pennsylvania Application November 16, 1955, Serial No. 547,140

4 Claims. (Cl. 307—88)

The invention relates, generally, to control systems and, more particularly, to flip-flop elements for control systems.

The object of the invention is to provide a flip-flop element of a control system that has adequate impedance in its signal circuits to protect the windings when connected to any signal source.

Other objects of the invention will, in part, be obvious and will, in part, appear hereinafter.

The invention, accordingly, comprises the features of construction, combination of elements and arrangement of parts which will be exemplified in the system hereinafter set forth, and the scope of the application of which will be indicated in the claims.

Figure 1:
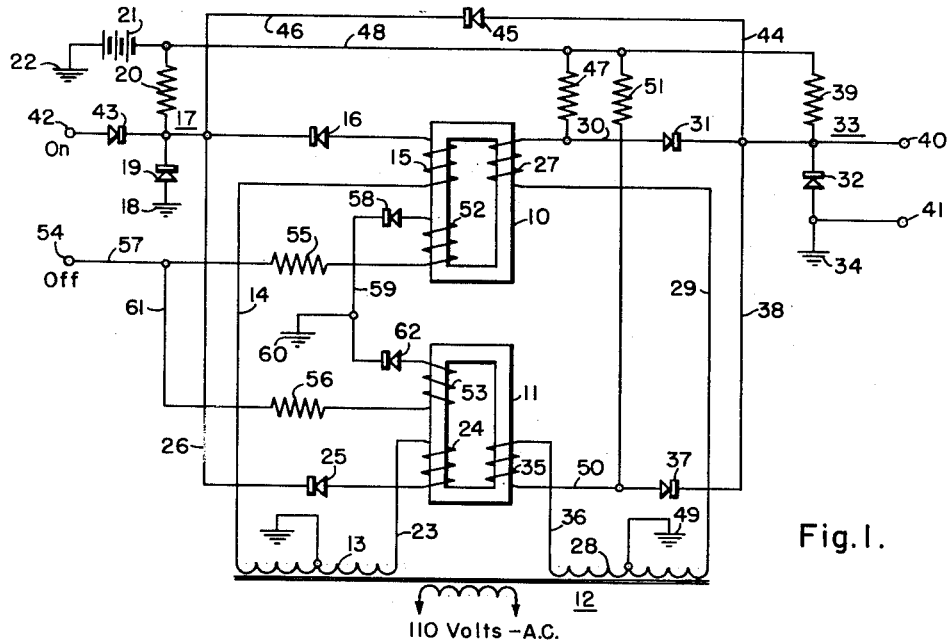
Figure 2:
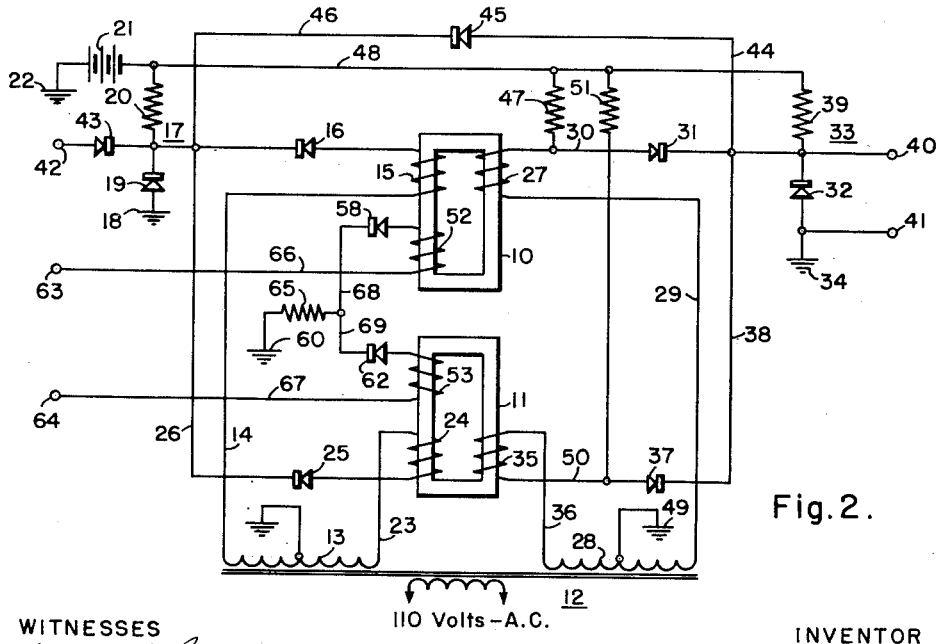

For a fuller understanding of the nature and objects of the invention, reference should be had to the following detailed description taken in connection with the accompanying schematic diagrams, in which:

Figure 1 is a circuit diagram of a flip-flop system embodying the features of the invention; and Fig. 2 is a circuit diagram of a modification of the invention illustrated in Fig. 1.

Referring now to the drawing, a flip-flop element for the control system illustrated is provided with two cores 10 and 11, each of which carries a plurality of coils utilized for driving the cores to positive and negative saturation alternately, as will be described hereinafter. In addition, the coils are provided with resetting and gating circuits so connected to a source of power, such as the transformer 12, that the required circuits, for effecting the positive and negative saturation of the cores alternately, are provided.

A number of non-linear devices are employed with the circuits to be described and traced hereinafter. The non-linear devices are so disposed in relationship to the circuits that they permit the flow of a predetermined magnetizing current to the coils or windings on the core members without any substantial voltage drop, and they also protect the circuits and apparatus from excessive current flow. Further, as the description proceeds and the circuits are traced, it will seem that the electric currents flow through the rectifiers or diodes of the non-linear devices in the backward or reverse direction. However, what actually happens is that there is a reduction in the electric current flow in the forward direction. The reduction in current flow may be predetermined by design to effect the performance of functions required from the control system of which the flip-flop element is a part.

In order to explain this embodiment of the flip-flop element for a control system embodying the inventive features, the circuits will now be traced and the functioning of the invention will be revealed as the specification proceeds.

The reset circuit for the core 10 extends from one terminal of the secondary winding 13 of the transformer 12 through conductor 14, the reset winding or coil 15, the rectifier 16 through a non-linear device shown generally at 17, to the ground at 18. In the normal operation of a flip-flop element, the coil 15 will drive the core 10 to negative saturation.

The non-linear device 17 comprises a rectifier 19 connected to the ground at 18, a resistor 20 connected to the negative pole of the battery 21. The positive pole of the battery is connected to ground at 22.

Non-linear devices such as illustrated at 17 and referred to hereinbefore are well known in the art and their construction and functioning need not be described in detail. It is sufficient to say that for small currents they offer low resistance to the flow of current and as the current increases the build-up of resistance is sufficient to protect the windings and coils of the circuit from excessive current flow.

A reset circuit for the core 11 may be traced from the other terminal of the secondary winding 13 of the transformer 12 through conductor 23, the reset winding or coil 24, the rectifier 25, conductor 26, rectifier 19 of the non-linear device 17 to ground at 18. This reset coil 24 is so connected that on the next or second half cycle, it will drive the core 11 to negative saturation.

In the operation of the circuit when on one or the first half cycle, reset circuit for the core 10 drives this core to negative saturation on the next or second half cycle of current, the coil 24 will drive the core 11 to negative saturation. Thus, we have two reset circuits for the cores 10 and 11 which drive their respective cores to negative saturation alternately.

As pointed out hereinbefore, the cores 10 and 11 have gating circuits. The gating circuit for the coil 27 of the core 10 extends from one terminal of the secondary winding 28 of the transformer 12 through conductor 29, the gating coil or winding 27, conductor 30, rectifier 31 through the rectifier 32 of the non-linear device shown generally at 33 to ground at 34.

As illustrated, the gating coil 35 on the core 11 is connected to the opposite terminal of the secondary winding 28 of the transformer 12. The gating circuit may be traced from the transformer through the conductor 36, gating coil 35, rectifier 37, conductor 38 through the rectifier 32 of a non-linear device 33 to ground at 34.

It will be obvious from the gating circuits traced that when the core 10 is driven to positive saturation on one-half cycle, the core 11 will be driven to positive saturation on the following half-cycle.

The non-linear device shown generally at 33 comprises a resistor 39 connected to the negative terminal of battery 21, the rectifier 32 being connected to ground at 34.

As shown, the flip-flop circuit element is provided with output terminals 40 and 41 from which an output may be delivered as described hereinafter to perform some useful function in a control system. The voltage of the output will depend upon the design of the flip-flop circuit element.

The flip-flop circuit element thus far described includes a transformer 12, two cores 10 and 11, reset circuits and gating circuits for each core, and output terminals. Therefore, when the transformer 12 stands energized, the cores 10 and 11 will be driven to positive and negative saturation alternately.

Assuming now that on the first half-cycle the core 10 is driven to negative saturation, then the core 11 will be driven to positive saturation. On the next half cycle, the gating circuit for the coil 27 will overcome the residual negative saturation and drive the core 10 to positive saturation while the reset circuit for the coil 24 of the core 11 will overcome the residual positive energization of the core and drive it to negative saturation. The flip-flop circuit element will thus continue to alternate the saturation of the cores 10 and 11 until they are interrupted in a manner to be described hereinafter.

A circuit is provided through which a signal may be delivered to the flip-flop circuit element. This circuit extends from a terminal 42 through the rectifier 43, the non-linear device 17 to the rectifiers 16 and 25. The signal delivered will usually be direct current and of a magnitude greater in voltage than the voltage applied across the reset coils 15 and 24 during a reset cycle. Therefore, when a signal is delivered to the terminal 42, it will block the flow of current through the reset coils 15 and 24.

Assuming now that the core 10 has been driven to positive saturation by the current flowing in the gating coil 27 and that the signal through the terminal 42 is applied at that instant, then the result is that the core 10 remains positively saturated during the following half cycle which would normally be a resetting half cycle for the core 10. On the next half cycle, which is a gating half cycle for the core 10, the current delivered from the secondary winding 28 of the transformer 12 will not be utilized in driving the core 10 to positive saturation, and will build up a voltage across the output terminals 40 and 41.

During the gating half cycle for the core 10 that produces a voltage across the terminals 40 and 41, a resetting half cycle should occur for the coil 24, but since flow of current in the reset circuit is blocked by the signal received through terminal 42 and the core 11 remains positively saturated. Therefore, on the following half cycle the current delivered from the secondary winding 28 to the transformer 12 will not be utilized in overcoming the residual negative saturation of the core 11 and will build up a voltage across the terminals 40 and 41 connected to the gating circuit already traced.

Therefore, when the signal delivered through the terminal 42 is applied, the cores 10 and 11 will alternately produce a voltage across the terminals 40 and 41, which voltage will be maintained as long as the signal delivered at 42 continues. The voltage across the terminals 40 and 41 may be utilized to perform a predetermined function in the control system.

In order to maintain an output voltage across the terminals 40 and 41 after the signal delivered to the terminal 42 is discontinued, a feedback circuit is provided. This feedback circuit extends from the terminal 40 through conductor 44, rectifier 45, conductor 46 to the rectifiers 16 and 25. It will be obvious that the current flowing in this feedback circuit will block the flow of current from the secondary winding 13 of the transformer 12 through the resetting coils 15 and 24, since the output voltage is by design always greater than the resetting voltage. When this feedback circuit is provided, the gating circuits for the coils 27 and 35 will maintain an output voltage across the terminals 40 and 41 irrespective of whether or not a signal is being received through the terminal 42.

However, it has been found that due to the characteristics of certain elements of the flip-flop element of a control system that the voltage across the terminals 40 and 41 will decrease and ultimately disappear. The decrease in voltage across the terminals 40 and 41 is due to leakage of the rectifiers and the fact that a perfect hysteresis loop for the cores 10 and 11 is never obtained. It has been found that the flux in the cores 10 and 11 will decay rapidly. In tests it has been found that generally the positive saturation of the cores 10 and 11 even with the feedback circuits will not last more than about twenty seconds after the signal received at 42 is discontinued.

When the positive saturation of the cores 10 and 11 disappears, the flip-flop circuit element can no longer deliver an output. In other words, it no longer stores a signal. Thus, the storing of the signal or the memory of the flip-flop element can only last until the positive flux in the cores 10 and 11 decays through these well known processes.

In order to store signals for any predetermined length of time, circuits are provided for maintaining the positive saturation of the cores 10 and 11 after an output has been built up across the terminals 40 and 41 through the positive saturation of the cores 10 and 11. The circuit for maintaining the positive saturation of the core 10 may be traced from one terminal of the secondary winding 28 of the transformer 12, through conductor 29, the gating coil 27, conductor 30, resistor 47, conductor 48, battery 21, to ground at 22, and through the ground 49 of the transformer 12 back to the winding 28. The circuit for maintaining the positive saturation of the core 11 extends from a terminal of the winding 28 of the transformer 12, through conductor 36, the gating coil 35, conductor 50, resistor 51, conductor 48, battery 21 to ground at 22 and back to the ground 49 of the transformer winding 28. It has been found that the resistors 47 and 51 may be designed to give the correct current flow for maintaining the cores positively saturated for days. In this way, an output voltage may be maintained across the terminals 40 and 41 irrespective of whether or not the signal to the terminal 42 is maintained. In this manner, the flip-flop circuit element is, in effect, given a memory which lasts as long as the positive energization of the cores 10 and 11.

In order to meet some applications of the flip-flop circuit element, it may be desirable to interrupt the output from the terminals 40 and 41 even when a signal is being supplied through the terminal 42. In cases where the flip-flop circuit element is applied in the control of the automatic machines, the interruption of the output at any moment may become highly desirable.

In order to give an operator control of the flip-flop circuit element so that he may interrupt the output from the terminals 40 and 41 at will, third coils or windings 52 and 53 are provided in the cores 10 and 11, respectively. These coils may be so designed and supplied with adequate current to effect the driving of the cores 10 and 11 to negative saturation irrespective of the magnetic conditions developed by the other coils on the cores. A current for energizing the coils 52 and 53 will be delivered from an independent signal source.

In this embodiment of the invention, a terminal 54 is provided for delivering what may be called a resetting signal. This terminal is also often called the off signal. In designing the flip-flop circuit element, the windings 52 and 53, the resistors 55 and 56 will be so coordinated with the voltage delivered at 54 that the delivery of an off signal will effect a driving of the cores 10 and 11 to negative saturation irrespective of the magnetic conditions existing in the flip-flop circuit element.

The circuit for the coil or winding 52 may be traced from the terminal 54 through conductor 57, resistor 55, the third winding 52, rectifier 58 and conductor 59 to ground at 60. When the signal is delivered through this circuit, the core 10 will be driven to negative saturation. The circuit for the third winding 53 extends from the terminal 54 through conductor 61, resistor 56, winding 53, rectifier 62 to ground at 60. The signal delivered through this circuit will drive the core 11 to negative saturation irrespective of the magnetic conditions in the flip-flop circuit element.

Third windings, such as 52 and 53, for driving the cores 10 and 11 to negative saturation have been utilized in other flip-flop circuit elements and in this connection reference is made to application Serial No. 517,780, filed June 24, 1955. However, in this invention the energizing circuits for the windings 52 and 53 have entirely different characteristics.

If the terminal 54 to which the off signal is delivered is connected to a source of supply, the circuit of which has a low impedance, currents dangerous to the windings 52 and 53 and other elements would flow if resistors or impedance elements 55 and 56 were not provided.

As shown, resistors 55 and 56 are disposed between the terminal 54 and the windings 52 and 53. In the design of the flip-flop circuit element, these resistors 55 and 56 can be made of such an ohmic value that only a predetermined current adequate for effecting the driving of the cores 10 and 11 to negative saturation will flow. Further, with rectifiers 58 and 62 disposed between the ground 60 and the windings 52 and 53, no back currents will flow which will unbalance the functioning of the system.

In the modification of the invention illustrated in Fig. 2, two terminals 63 and 64 are provided for delivering off signals. The voltage applied at these terminals will be predetermined to meet the other design factors of the flip-flop element.

As shown, the terminal 63 is connected through conductor 66 to the third winding 52 on the core 10. The terminal 64 is connected through conductor 67 to the third winding 53 on the core 11.

The circuits may be traced as follows: The signal to the terminal 63 flows through conductor 66, winding 52, rectifier 58, conductor 68, resistor 65 to ground at 60. The circuit from terminal 64 extends through conductor 67, third winding 53, rectifier 62, conductor 69, resistor 65 to ground at 60.

In this embodiment of the invention, only one resistor 65 is provided, but since it is disposed between the windings 52 and 53 and the ground connection at 60, it will so limit the flow of current that it protects the windings 52 and 53 and other elements of the flip-flop circuit element from excess current flow.

Since the circuits from the terminals 63 and 64 are provided with rectifiers 58 and 62, respectively, the flip-flop element will not be subjected to back currents which may upset the proper functioning of the system. Further, if the elements are connected to circuit systems having low impedance, there is no danger of currents of large magnitude being delivered which will be injurious to the windings and other elements.

It will be noted that the flip-flop circuit element illustrated in Fig. 2 is the same as that illustrated in Fig. 1, with the exception of a means for protecting the windings from current flow from the signal terminals 63 and 64. Therefore, it will be unnecessary to trace the reset and gating circuits since they will be exactly the same as the description given for such circuits in Fig. 1.

Since certain changes may be made in the above construction and different embodiments of the invention could be made without departing from the scope thereof, it is intended that all matter contained in the above description or shown in the accompanying diagrams shall be interpreted as illustrative and not in a limiting sense.

I claim as my invention:

1. In a flip-flop element of a control system, in combination, a plurality of cores, a plurality of windings on each core, a reset circuit connecting the core windings of each core to a power supply means, a gating circuit connecting another winding of each core to a power supply means, the reset and gating circuits being so connected that they function to drive the cores to positive and negative saturation alternately, means including circuit connections for delivering a signal to a third winding on each core for driving the cores to negative saturation, and means connected in the circuit connections of the third winding on the cores to restrict the flow of current whereby the flip-flop element of a control system may be connected to a signal delivering means having a low impedance.

2. In a flip-flop element of a control system, in combination, a plurality of cores, a plurality of windings on each core, a reset circuit connecting one winding of each core to a power supply means, a gating circuit connecting another winding on each core to a power supply means, the reset and gating circuits being so connected that they function to drive the cores to positive and negative saturation alternately, means including a circuit for delivering a signal to a third winding on one core, means including a circuit for delivering a signal to a third winding on another core, the circuits for delivering the signals to the third windings on the cores having capacity to deliver signals capable of driving the cores to negative saturation, each circuit having an impedance capable of limiting the signal to a current that will be safe for the system, whereby the flip-flop element may be connected to a signal delivering means having either a high or low impedance.

3. In a flip-flop element of a control system, in combination, a plurality of cores, a plurality of windings on each core, a reset circuit connecting one winding of each core to a power supply means, a gating circuit connecting another winding on each core to a power supply means, the reset and gating circuits being so connected that they function to drive the cores to positive and negative saturation alternately, means including a circuit for delivering a signal to a third winding on one core, means including a circuit for delivering a signal to a third winding on another core, the circuits for delivering the signals to the third windings having capacity to deliver signals capable of driving the cores to negative saturation, each circuit having a resistor connected in series circuit relation therewith for restricting the current flow to the windings whereby the flip-flop element may be connected to signal delivering means having either a high or low impedance.

4. In a flip-flop element of a control system, in combination, a plurality of cores, a plurality of windings on each core, means for supplying power, a reset circuit connecting one winding of each core to a power supply means, a gating circuit connecting another winding on each core to a power supply means, the reset and gating circuits being so connected that they function to drive the cores to positive and negative saturation alternately, means including circuit connections for delivering a signal to a third winding on each core for driving the cores to negative saturation, each signal circuit having an impedance to restrict the current flow irrespective of the impedance of the signal delivering means, and means to prevent any substantial back current in the signal circuits for the third windings on each core.

No references cited.